(12) United States Patent
Motylinski et al.

(10) Patent No.: US 12,170,590 B2
(45) Date of Patent: Dec. 17, 2024

(54) OPTIMISATION OF NETWORK PARAMETERS FOR ENABLING NETWORK CODING

(71) Applicant: nChain Licensing AG, Zug (CH)

(72) Inventors: Patrick Motylinski, London (GB); Simone Madeo, London (GB); Giuseppe Destefanis, London (GB); Stephane Vincent, Luxembourg (LU)

(73) Assignee: nChain Licensing AG, Zug (CH)

( * ) Notice: Subject to any disclaimer, the term of this patent is extended or adjusted under 35 U.S.C. 154(b) by 23 days.

(21) Appl. No.: 18/099,249

(22) Filed: Jan. 19, 2023

(65) Prior Publication Data
US 2023/0239200 A1 Jul. 27, 2023

Related U.S. Application Data

(63) Continuation of application No. 16/629,937, filed as application No. PCT/IB2018/054994 on Jul. 6, 2018, now Pat. No. 11,575,565.

(30) Foreign Application Priority Data

Jul. 11, 2017 (GB) ..................................... 1711125

(51) Int. Cl.
H04L 41/0803 (2022.01)
G06F 16/23 (2019.01)
(Continued)

(52) U.S. Cl.
CPC ...... H04L 41/0803 (2013.01); G06F 16/2379 (2019.01); G06F 16/2465 (2019.01);
(Continued)

(58) Field of Classification Search
CPC ... H04L 41/0803; H04L 47/11; G06F 16/2379
See application file for complete search history.

(56) References Cited

U.S. PATENT DOCUMENTS 7,693,939 B2   4/2010   Wu et al.
9,544,126 B2   1/2017   Zeger et al.
(Continued)

FOREIGN PATENT DOCUMENTS

CN   101841479 A   9/2010
CN   106603198 A   4/2017
(Continued)

OTHER PUBLICATIONS

Andresen, "O(1) Block Propagation," GitHub, retrieved from https://gist.github.com/gavinandresen/e20c3b5a1d4b97f79ac2, 2014, 11 pages.
(Continued)

Primary Examiner — Kristie D Shingles
(74) Attorney, Agent, or Firm — Davis Wright Tremaine LLP

(57) ABSTRACT

Methods and devices for propagating transactions in a network of nodes, each node having one or more connections to other nodes. The method includes receiving a plurality of incoming transactions over a time period; combining the plurality of incoming transactions using network coding to generate a composite message; sending the composite message to one or more nodes in the network; and determining an adjusted time period based on an equilibrium constant parameter and a count of transactions in the plurality of incoming transactions received over the time period.

18 Claims, 10 Drawing Sheets

(51) Int. Cl.
*G06F 16/2458* (2019.01)
*H04L 47/11* (2022.01)
*G06Q 20/22* (2012.01)
*H04L 9/00* (2022.01)
*H04L 9/32* (2006.01)
*H04L 47/38* (2022.01)

(52) U.S. Cl.
CPC .......... *H04L 47/11* (2013.01); *G06F 2216/03* (2013.01); *G06Q 20/223* (2013.01); *H04L 9/3239* (2013.01); *H04L 9/50* (2022.05); *H04L 47/38* (2013.01)

(56) References Cited

U.S. PATENT DOCUMENTS

| | | | |
|---|---|---|---|
| 10,354,325 | B1 | 7/2019 | Skala et al. |
| 10,915,891 | B1 | 2/2021 | Winklevoss et al. |
| 2006/0251062 | A1 | 11/2006 | Jain et al. |
| 2008/0089333 | A1* | 4/2008 | Kozat ............... H04L 45/123 370/390 |
| 2013/0107764 | A1* | 5/2013 | Zeger ............... H04L 5/16 370/280 |
| 2013/0195106 | A1 | 8/2013 | Calmon et al. |
| 2016/0191402 | A1 | 6/2016 | Anderson et al. |
| 2017/0150299 | A1 | 5/2017 | Coutinho et al. |
| 2017/0366353 | A1 | 12/2017 | Struttmann |
| 2018/0039667 | A1* | 2/2018 | Pierce ............... H04L 9/3247 |
| 2018/0322597 | A1 | 11/2018 | Sher |
| 2018/0331781 | A1 | 11/2018 | Welin et al. |

FOREIGN PATENT DOCUMENTS

| | | |
|---|---|---|
| JP | S60264145 A | 12/1985 |
| JP | 2007036910 A | 2/2007 |
| WO | 2017098326 A1 | 6/2017 |
| WO | 2019180526 A1 | 9/2019 |
| WO | 2019216975 A1 | 11/2019 |

OTHER PUBLICATIONS

Antonopoulos, "Mastering Bitcoin—Unlocking Digital Cryptocurrencies," O'Reilly Media, Inc., Dec. 20, 2014, 282 pages.
Hundeboll et al., "Impact of Network Coding on Delay and Throughput in Practical Wireless Chain Topologies," Consumer Communications and Networking Conference, Jan. 11, 2013, 6 pages.
International Search Report and Written Opinion mailed Oct. 22, 2018, Patent Application No. PCT/IB2018/054994, 14 pages.
Kokoris-Kogias et al., "Enhancing bitcoin security and performance with strong consistency via collective signing," 25th Usenix Security Symposium 2016, Aug. 10, 2016, 19 pages.
Maxwell, "User:Gmaxwell/block Network Coding," Bitcoin Wiki, retrieved from https://en.bitcoin.it/wiki/User:Gmaxwell/block_network_coding, Mar. 2015, 3 pages.
Nakamoto, "Bitcoin: A Peer-to-Peer Electronic Cash System," Bitcoin, Oct. 31, 2008, https://bitcoin.org/bitcoin.pdf, 9 pages.
Satoshi et al., "Connection Limits," Bitcoin Forum, Aug. 9, 2010, https://bitcointalk.org/index.php?topic=741.0;prev_next=prev, 2 pages.
Swapna et al., "Throughput-Delay Analysis of Random Linear Network Coding for Wireless Broadcasting," IEEE International Symposium ON, Jun. 9, 2010, 6 pages.
UK Commercial Search Report mailed Nov. 7, 2017, Patent Application No. GB1711125.3 , 5 pages.
UK IPO Search Report mailed Dec. 15, 2017, Patent Application No. GB1711125.3, 4 pages.
Yang et al., "Adaptive Network Coding for Scheduling Real-time Traffic with Hard Deadlines," retrieved from https://dl.acm.org/citation.cfm?id=2248389, 2012, 10 pages.

* cited by examiner

OPTIMISATION OF NETWORK PARAMETERS FOR ENABLING NETWORK CODING

CROSS REFERENCE TO RELATED APPLICATIONS

This application is a continuation of U.S. patent application Ser. No. 16/629,937, filed Jan. 9, 2020, entitled "OPTIMISATION OF NETWORK PARAMETERS FOR ENABLING NETWORK CODING," which is a 371 National Stage of International Patent Application No. PCT/IB2018/054994, filed Jul. 6, 2018, which claims priority to United Kingdom Patent Application No. 1711125.3, filed Jul. 11, 2017, the disclosures of which are incorporated herein by reference in their entirety.

SUMMARY

This invention relates generally to propagating transactions in a network and to methods and devices to improve transaction processing speed.

In this document we use the term 'blockchain' to include all forms of electronic, computer-based, distributed ledgers. These include, but are not limited to consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

A blockchain is a consensus-based, electronic ledger which is implemented as a computer-based decentralised, distributed system made up of blocks which in turn are made up of transactions. Each transaction (Tx) is a data structure that encodes the transfer of control of a digital asset between participants in the blockchain system, and includes at least one input and at least one output. Each block contains a hash of the previous block so that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

Network nodes that receive a new transaction will quickly try to push that transaction out to other nodes in the network. Before transmitting a new transaction to other nodes, it is "validated", meaning it is checked against a set of criteria to ensure the transaction meets the basic requirements for a proper transaction according to the applicable blockchain protocol.

In order for a transaction to be written to the blockchain, it is incorporated into a block by a node (a "miner" or "mining node") that is designed to collect transactions and form them into blocks. The miner then attempts to complete a "proof of work" with respect to the node. Miners throughout the blockchain network compete to be the first to assemble a block of transactions and complete the associated proof of work for that block. The successful miner adds its confirmed block to the blockchain and the block is propagated through the network so that other nodes that maintain a copy of the blockchain can update their records. Those nodes receiving a block also "validate" that block and all the transactions in it to ensure it complies with the formal requirements of the protocol.

It would be advantageous to enable or facilitate the use of widespread, cryptographically-secured exchanges using a blockchain-based network like Bitcoin. Such an exchange could relate to, for example, payment processing such as for credit card transactions. However, the transaction throughput of about 3 per second is insufficient for handling such electronic payments, which currently operate at a transactional volume of about 50,000 per second. One of the bottlenecks associated with speed of the blockchain network is propagation of transactions. Each node that receives a transaction validates the transaction and then send it to peer nodes. In fact, in the Bitcoin protocol, a node will send an INV message containing a list of transactions to a peer node and will receive a GETDATA response message selecting some subset of the transactions advertised in the INV message. The node then sends the requested transactions to the peer node. This process is carried out with respect to each peer node to which the node is connected.

Accordingly, it would be desirable to find a solution to the speed and scalability constraints that currently limit blockchain's ability to process high-volume transactions by improving the speed of transaction propagation. It would be desirable to find a solution more generally applicable to propagation of transactions in a network of nodes, whether related to blockchain or other applications.

Such a solution has now been devised.

Thus, in accordance with the present invention there are provided methods and devices as defined in the appended claims.

The present application describes and discloses methods and devices that enable fast propagation of transactions (TXs). In some examples, nodes selectively enable the use of network coding to combine transactions into a single message for sending to peer nodes. The selective use of network coding may be based on determining that the node is a potential bottleneck. The solution may be applied in the context of a blockchain network in some implementations.

In an additional or alternative aspect, the present application describes a computer-implemented method to propagate transactions in a network of nodes, each node having one or more connections to other nodes. The method, implemented at one of the nodes, includes determining that the one of the nodes is a bottleneck for propagation of transactions; receiving, over a first time period, a plurality of new transactions from one or more first nodes in the network of nodes; combining the plurality of new transactions using network coding and a local encoding vector to generate a message; and sending the message and a global encoding vector to one or more second nodes in the network of nodes instead of sending the plurality of new transactions to the one or more second nodes.

In an additional or alternative aspect, the present application describes a node that includes a processor, memory, a network interface, and an application containing instructions that, when executed by the processor, perform one or more of the methods described herein.

In some implementations, the method or node determines that the node is a bottleneck by assessing a number of in-links to the node and a number of out-links from the node, and determining that the node is a bottleneck when the number of in-links exceeds the number of out-links. The assessment may occur at the time of receipt of a first transaction of the plurality of new transactions. In another implementation, the assessment may occur through tracking a count of in-links and a count of out-links over time, and wherein the number of in-links is an average and the number of out-links is an average. In some example implementations, the node initiates the determination that it is a bottleneck in response to receiving a first transaction of the plurality of new transactions.

In some implementations, the combining and sending is performed in response to determining that a stopping condition has been met. The stopping condition, in one example, expiry of a time duration since either receipt of a first of the plurality of new transactions or the determination that said one of the nodes is a bottleneck. In another example, the stopping condition is that the plurality of new transactions has reached a maximum number of new transactions.

In some implementations, the message has a length no longer than a longest transaction in the plurality of new transactions.

In an additional or alternative aspect, the present application describes a node to propagate transactions in a network of nodes, each node having one or more connections to other nodes. The node includes a processor; memory; a network interface; and an application containing processor-executable instructions. The instruction, when executed by the processor, cause the processor to receive a plurality of incoming transactions over a time period; combine the plurality of incoming transactions using network coding to generate a composite message; send the composite message to one or more nodes in the network; and determine an adjusted time period based on an equilibrium constant parameter and a count of transactions in the plurality of incoming transactions received over the time period.

In yet a further additional or alternative aspect, the present application describes a computer-implemented method of propagating transactions in a network of nodes, each node having one or more connections to other nodes. The method, implemented at one of the nodes, includes receiving a plurality of incoming transactions over a time period, combining the plurality of incoming transactions using network coding to generate a composite message, sending the composite message to one or more nodes in the network, and determining an adjusted time period based on an equilibrium constant parameter and a count of transactions in the plurality of incoming transactions received over the time period.

Some implementations include iteratively repeating the receiving, combining and sending operations using the adjusted time period and determining a further adjusted time period after each iteration for use in the subsequent iteration.

In some implementations, determining the adjusted time period includes determining the adjusted time period based on the equilibrium constant parameter divided by the count of transactions. In some cases the determination is subject to a minimum time period that the adjusted time period cannot be below and a maximum time period that the adjusted time period cannot be above.

Some implementations include determining an average time period based on a plurality of adjusted time periods and storing the average time period in memory at said one of the nodes. In some cases the average time period is sent to one or more neighbouring nodes in the network of nodes.

Some implementations include initializing the equilibrium constant parameter based on one or more throughput estimates for one of more links to said one of the nodes. Yet other implementations may include initializing the equilibrium constant parameter based on an estimated initial time period and an estimated initial count of transactions.

Some implementations include determining that the count of transactions received in the time period exceeds a minimum count to use network coding, and wherein the combining and sending are conditional on that determination.

In an additional or alternative aspect, the present application describes a non-transitory processor-readable medium storing processor-executable instructions to propagate transactions within a network of nodes, wherein the processor-executable instructions, when executed by a processor in one of the nodes, cause the processor to carry out one or more of the methods described herein.

In many of the example implementations described herein, specific reference is made to blockchain transactions; however, it will be appreciated that the methods and devices described herein may be implemented and applied in connection with non-blockchain transaction propagation.

BRIEF DESCRIPTION OF DRAWINGS

These and other aspects of the present invention will be apparent from and elucidated with reference to, the embodiment described herein. An embodiment of the present invention will now be described, by way of example only, and with reference to the accompanying drawings, in which.

DETAILED DESCRIPTION

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Figure 1:
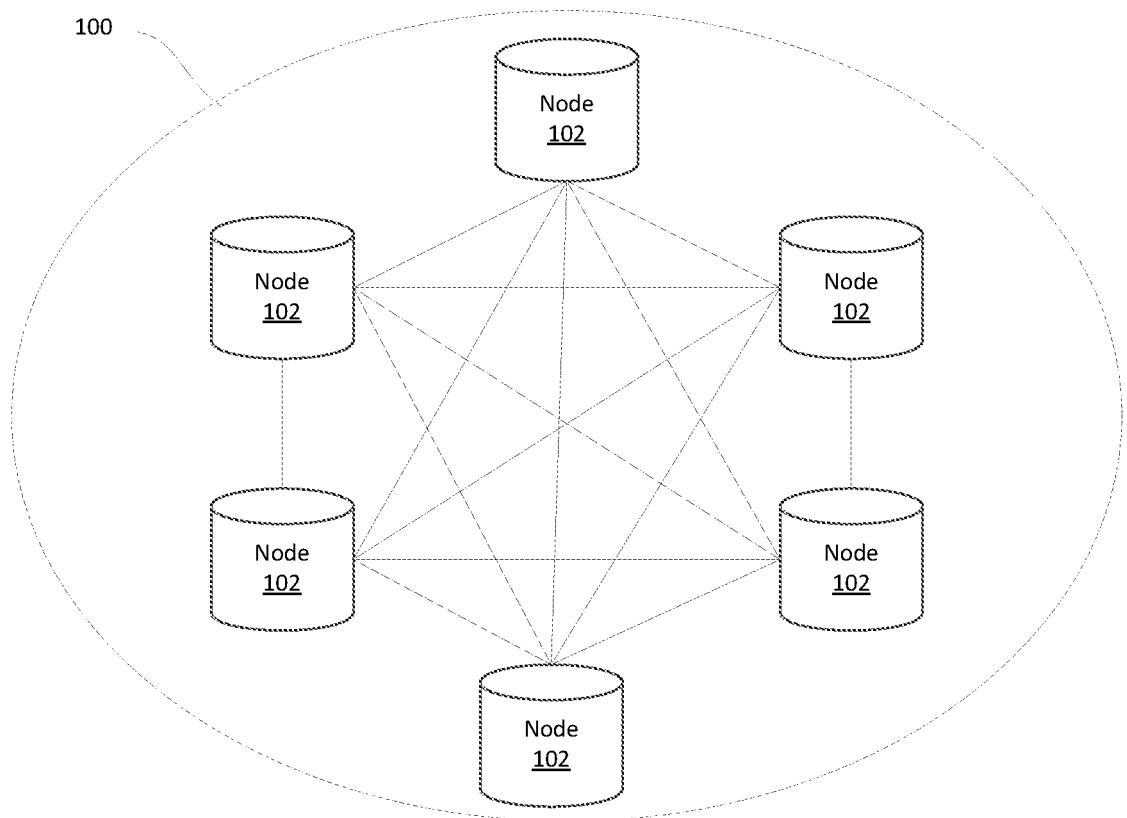
FIG. 1 illustrates an example network associated with a blockchain.

Reference will first be made to FIG. 1 which illustrates, in block diagram form, an example network associated with a blockchain, which may be referred to herein as a blockchain network 100. The blockchain network 100 is a peer-to-peer open membership network which may be joined by anyone, without invitation or without consent from other members. Distributed electronic devices running an instance of the blockchain protocol under which the blockchain network 100 operates may participate in the blockchain network 100. Such distributed electronic devices may be referred to as nodes 102. The blockchain protocol may be a Bitcoin protocol, or other cryptocurrency, for example.

The electronic devices that run the blockchain protocol and that form the nodes 102 of the blockchain network 100 may be of various types including, for example, computers such as desktop computers, laptop computers, tablet computers, servers, mobile devices such a smartphones, wearable computers such as smart watches or other electronic devices.

Nodes 102 of the blockchain network 100 are coupled to one another using suitable communication technologies which may include wired and wireless communication technologies. In many cases, the blockchain network 100 is implemented at least partly over the Internet, and some of the nodes 102 may be located in geographically dispersed locations.

Nodes 102 maintain a global ledger of all transactions on the blockchain, grouped into blocks each of which contains a hash of the previous block in the chain. The global ledger is a distributed ledger and each node 102 may store a complete copy or a partial copy of the global ledger. Transactions by a node 102 affecting the global ledger are verified by other nodes 102 so that the validity of the global ledger is maintained. The details of implementing and operating a blockchain network, such as one using the Bitcoin protocol, will be appreciated by those ordinarily skilled in the art.

Each transaction typically has one or more inputs and one or more outputs. Scripts embedded into the inputs and outputs specify how and by whom the outputs of the transactions can be accessed. The output of a transaction may be an address to which value is transferred as a result of the transaction. That value is then associated with that output address as an unspent transaction output (UTXO). A subsequent transaction may then reference that address as an input in order to spend or disperse that value.

Nodes 102 may be of different types or categories, depending on their functionality. It has been suggested that there are four basic functions associated with a node 102: wallet, mining, full blockchain maintenance, and network routing. There may be variations of these functions.

Nodes 102 may have more than one of the functions. For example, a "full node" offers all four functions. A lightweight node, such as may be implemented in a digital wallet, for example, and may feature only wallet and network routing functions. Rather than storing the full blockchain, the digital wallet may keep track of block headers, which serve as indexes when querying blocks. Nodes 102 communicate with each other using a connection-oriented protocol, such as TCP/IP (Transmission Control Protocol).

In most blockchain networks, irrespective of the governing protocol, it is advantageous to ensure that new transactions are propagated quickly through the network so that all nodes that maintain a pool of unconfirmed transactions (typically called the "mempool") have an up-to-date and accurate database of transactions awaiting inclusion in a new block. Mining nodes draw on this pool of unconfirmed transactions to build potential new blocks. In some cases, the mining nodes maintain a full mempool locally so that they can assemble unconfirmed transactions into a new block for mining. In some embodiments, the mempool may be managed and maintained by a separate network of nodes (which may be called validator nodes, or the like) and those nodes may sent a set of unconfirmed transactions from the mempool to the mining nodes to enable the mining nodes to attempt to mine a block. In some implementations, the mempool may be stored in a distributed hash table among a plurality of nodes. Irrespective of the structure, it is desirable that any new transaction be propagated through the network to reach the necessary nodes as soon as possible. It is also desirable that any new successfully mined blocks be propagated through the network as fast as possible so as to reduce the occurrence of orphan blocks.

In current implementations of the Bitcoin network, as an example, each node that receives a new transaction validates the transaction and then sends it to all of the nodes to which it is connected if those nodes have not already received the new transaction. In case of Bitcoin, the nodes use TCP/IP (Transmission Control Protocol). A node that receives a new transaction sends an INV message to each peer node with data regarding the available new transaction(s), and will receive back a GETDATA message from each node interested in receiving the new transaction(s). The node then sends, the transaction in a (separate) TCP message to each of the nodes that requested it.

Figure 2:
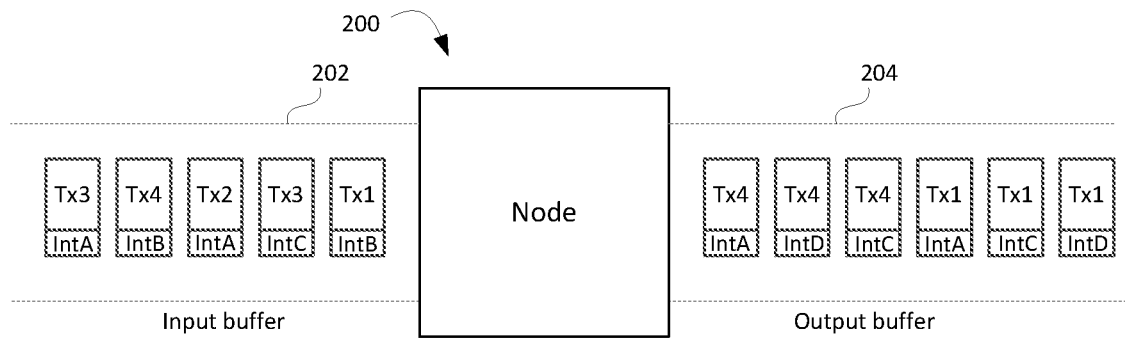
FIG. 2 diagrammatically shows an example node with an input buffer and an output buffer.

Reference is now made to FIG. 2, which diagrammatically shows an example node 200 with an input buffer 202 and an output buffer 204. The example node 200 has network interfaces with multiple peer nodes, referenced as intA, intB, intC, intD, etc. The input buffer 202 shows incoming transactions from the various peer nodes, and the output buffer 204 shows the transmission of certain received transactions to peer nodes over the respective interfaces. Network packets are serially sent and received at an application-level according to the primitives provided by the operating system of the node 202. Assuming that a transaction x fits in a single Ethernet/IP packet, its transmission to m peers requires the buffering of m different output packets. Both input and output network packets, along with other information, will contain a serialized transaction and a logical interface ID representing the TCP/IP connection to the sending/receiving peer.

The expected time for an incoming transaction to be processed depends on the average length (in packets) of the input queues $L_i$, while the expected time for a processed transaction to be correctly transmitted depends on the average length of the output queue $L_o$. Therefore, the efficient relay of transactions relies on the reduction of both $L_i$ and $L_o$ values. However, a probabilistic model for selective relay of the transactions to the peers directly affects $L_o$ and by induction also $L_i$.

In the current Bitcoin implementation, INV and GETDATA message packets are queued in the I/O buffers in the same way as transactions, with a severe impact on the transmission and reception delays.

There are proposals to use blockchain for higher-volume fast transactions. For example, consideration is being given to using blockchain for processing payments. Payment processing may include, for example, credit card transactions. The volume of such transactions would be overwhelming for current implementations of blockchain networks. It would therefore be advantageous to provide for methods and devices that improve a blockchain network's capacity to process communications, such as the sending of transactions between nodes.

In accordance with one aspect of the present application, a blockchain node buffers new transactions over a particular time period, and then uses network coding to combine the transactions into a single message that is then sent to one or more other blockchain nodes. That is a blockchain node encodes the new transactions to produce a message that mixes the new transactions in a way that can be unravelled, but that produces a combined message. The combined message has a size of the largest of the transactions plus a small overhead.

If the blockchain node uses network coding, then the node may also do away with relying on TCP/IP INV and GET-DATA messages, since the node will send all new transactions in the form of the encoded message rather than having nodes pick-and-choose which subset of the new transactions they want to receive.

Figure 3:
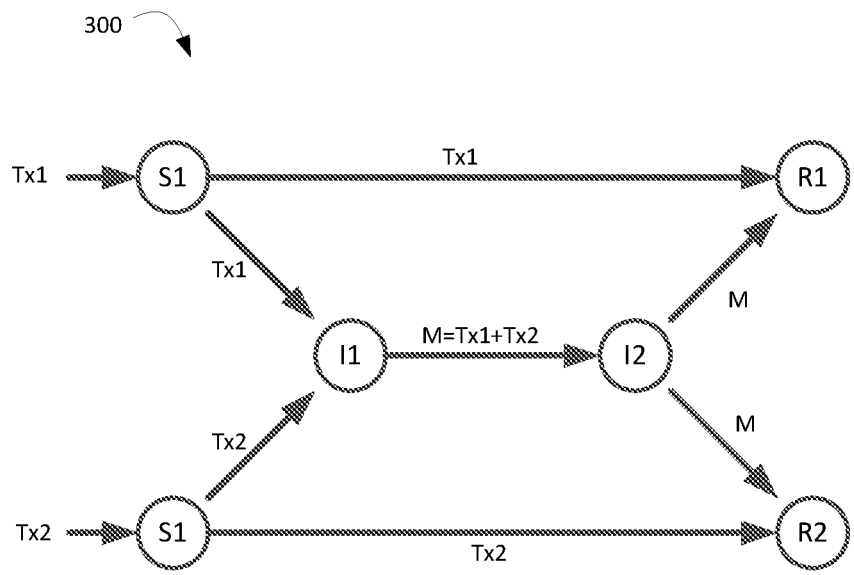
FIG. 3 shows a simplified example network of nodes in a network.

Reference is now made to FIG. 3, which shows a simplified example network of nodes in a blockchain network 300. Each node represents a network terminal (i.e., a blockchain node), while edges represent links between nodes. For the purposes of this illustration it is supposed that for each link it is possible to send or receive a single bit at a time.

Two of the nodes are labelled as sources, S1 and S2, which receive two new transactions tx1 and tx2. In this example blockchain network 300, each node maintains a mempool of unconfirmed transactions so when a node receives a new transaction it is propagated through the network to all other nodes. Each node is to validate and store the new transactions in their respective local mempool and forward the new transactions to any peer nodes that to not yet have the new transactions. Due to the peer-to-peer nature of the blockchain network 300, all nodes do not receive a new transaction at the same time, meaning it will take some time for a new transaction to reach all nodes in the network 300. For example, in a current implementation of the Bitcoin network a new valid transaction will take an average of 3.5 seconds to reach the 90% of the nodes of the Bitcoin network. In theory, if the transmission of a transaction were immediate, e.g., t=0 for reaching all the nodes of the network, the network would be protected against possibilities of double spending attacks. Improving the throughput of a blockchain network is therefore a key element for allowing scalability and reliability of the whole system.

Two of the nodes of the blockchain network 300 are labelled as receivers, R1 and R2.

Nodes I1 and I2 represent intermediate nodes which may, or may not, store a copy of the mempool, but more significantly represent a bottleneck for the network 300 at time T. When node I1 receives the two new transactions, Tx1 and Tx2, at approximately the same time it must decide which transaction to send first. That is, the outgoing edge from I1 to I2 is a bottleneck at least at time T.

Using network coding, the node I1 may combine the new transactions Tx1 and Tx2 into a composite message M that is the same size as the larger of Tx1 and Tx2. It sends message M to node I2, which then forwards message M to receivers R1 and R2. The receivers R1 and R2 are able to recover the individual transactions Tx1 and Tx2. For example, receiver R1 will receive Tx1 and M. Since M is based on a combination of Tx1 and Tx2, R1 only needs to solve the equations (Tx1, Tx1+Tx2) to elicit Tx2. On the contrary, R2 will receive Tx2 and need to solve the equations (Tx2, Tx1+Tx2) to elicit Tx1.

Bottlenecks can appear or disappear over time, depending on the configuration of the network and where transactions are generated at any given time. A bottleneck is a link (edge) between nodes which heavily limits the performance of the network and, specifically in the case of the blockchain network, slows down the transmission of transactions (or blocks). However, the source of a bottleneck (link between nodes) is a node.

Figure 4:
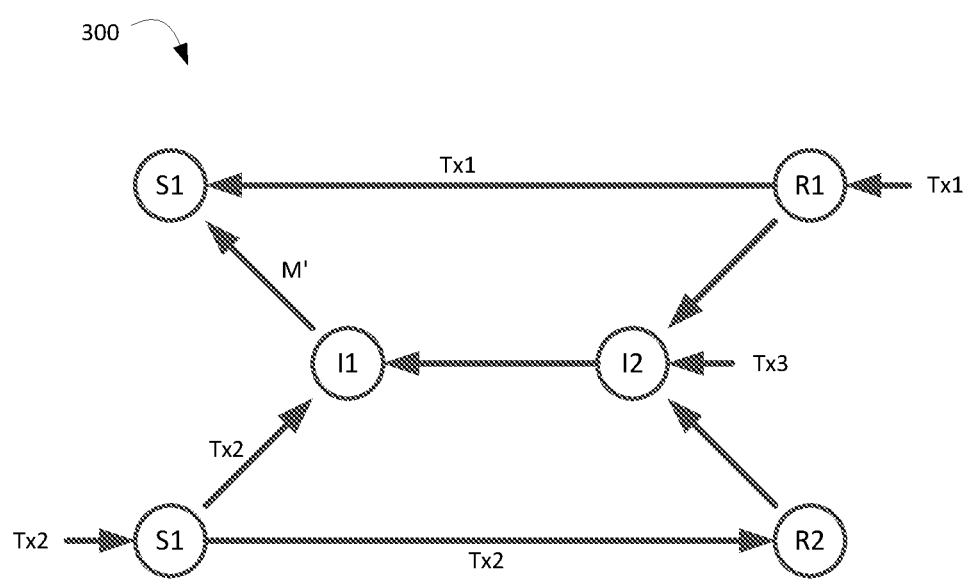
FIG. 4 shows the network of FIG. 3 at another time.

Reference is now made to FIG. 4, which shows the same blockchain network 300 at a time T'. In this example, transaction Tx1 is received at node R1 and transaction Tx3 is received at node I2. In this case, there is a bottleneck again at node I1, but this time with respect to the link between node I1 and node S1 due to the arrival at node I1 of both Tx2 and Tx3 at the same time. Using network coding, node I1 may combine Tx2 and Tx3 into a message M'.

One option is to have every node apply network coding in all situations. However, it may be possible to improve performance further by selectively applying network coding at particular nodes at which it might be expected to be advantageous at the time. As an example, if a node is able to determine whether it represents a bottleneck at any given point in time, then that node may selectively or adaptively apply network coding to the transmission of messages, whereas it may use regular transmission of transactions if it is not a bottleneck.

Accordingly, a node may be configured to evaluate or determine whether it is a likely bottleneck at a given point in time. In one sense this may be determined based on the balance between in-links and out-links. That is, at a given point in time, the node may receive transactions on one or more links and may intend to send those transactions out on one or more links. A connection (i.e. edge) between nodes may serve as an in-link or out-link at any given point in time depending on the flow of traffic in the network. The number of in-links may be referred to as "fan-in" and the number of out-links may be referred to as "fan-out" in some cases.

Figure 5:
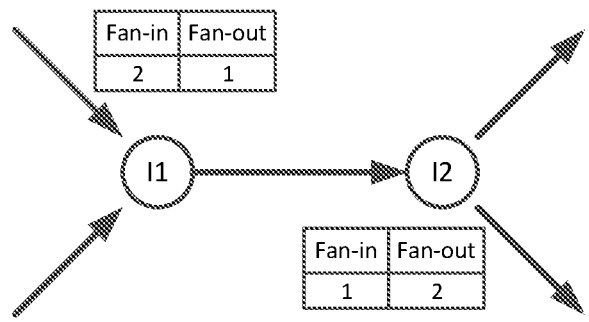
FIG. 5 diagrammatically shows a portion of an example network.

In one implementation, at least some of the nodes in a blockchain network maintain a table or other data structure tracking the relative number of fan-in and fan-out links to first-neighbour nodes. FIG. 5 diagrammatically shows a portion of an example network in which a first node I1 and a second node I2 each locally store a table or other data structure that, at any given time, identifies the fan-in and fan-out quantities for that node. On the basis of the relative fan-in and fan-out numbers a node may determine whether it is a likely bottleneck or not. In general, the determination may be based on whether the number of in-links (fan-in) exceeds the number of out-links (fan-out), in which case the node may be a bottleneck at that time.

In one example implementation, the assessment of whether a node is a bottleneck is over a period of time $\Delta T$. The quantities in the table may be an average fan-in and fan-out over the time period $\Delta T$.

The determination may also be partly based on awareness of network topology in some implementations. For example, a node that is a peripheral node is unlikely to be a bottleneck, whereas a node that is an intermediary node is more likely to be a bottleneck, at least on some occasions.

In yet other implementations, the determination of whether a node is a bottleneck may be based on the status of the output queue, or an assessment of backlog in the output queue over time.

The determination or identification of bottlenecks may, in some implementations, including a combination or sub-combination of the above factors.

Network coding was developed a little less than twenty years ago as an alternative to the dominant packet-switched networking of the time. Network coding models a network as a direct graph (N,L) with link capacities, demonstrating that a node $n \in N$ can communicate information to a set of receivers $R \subseteq N$ at a rate achieving the broadcast capacity h, with h being the value of the minimum cut between s and any $r \in R$ provided encoding at the interior nodes of the network.

A cut C is defined as a partition of the vertices V of a graph G=(V,E) into two disjoint subsets S and T. The cut-set of a cut C=(S,T) is the set {(u, v)∈E|u∈S, v∈T} of edges that have one endpoint in S and the other endpoint in T.

Figure 6:
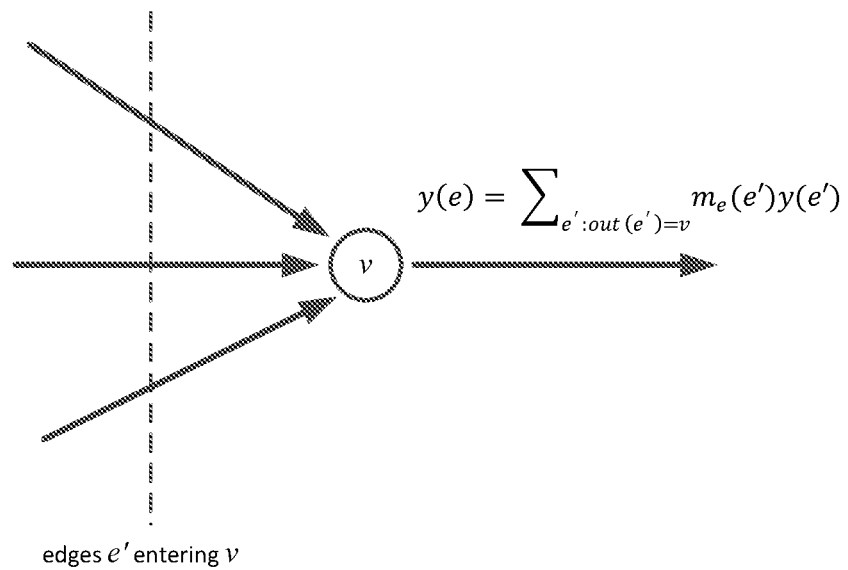
FIG. 6 illustrates a node with in-links and one out-link.

An example methodology for network coding was described by P. A. Chou, Y. Wu, and K. Jain, "Practical Network Coding", in *Proceedings of the annual Allerton conference on communication control and computing*, v.41, pp. 40-49, The University (2003) (hereinafter "Chou"), which is hereby incorporated by reference. This methodology removed the need for any centralized knowledge of the network topology or the encoding or decoding functions. Chou states that a network N can be represented as an acyclic graph G=(V,E) with unit capacity edges (e), a sender s∈V, and a certain number of receivers T⊆E. Each edge e∈E output for a node v=in(e) has a symbol y(e) which is a linear combination of the symbol y(e') on the edges e' entering v. FIG. 6 illustrates the node v and the output y(e). In particular, the output is given by:

$$y(e) = \Sigma_{e':out(e')=v} m_e(e') y(e')$$

where $y(e'_i) = x_i$, i=1, ..., h, and the vector $m_e$ is the local encoding vector representing the encoding function at node v for the edge e, and h indicates the broadcast capacity as the minimum number of edges in any cut between the sender and receiver.

Chou states that the output y(e) on any edge e∈E is a linear combination $y(e) = \Sigma_{i=1}^{h} g_i(e) x_i$ of the source symbols, and the h-dimensional vector of coefficients $g(e) = [g_1(e), ..., g_h(e)]$ can be recursively obtained by $g(e) = \Sigma_{e':out(e')} m_e(e') g(e')$, where $g(e'_i)$ on the edge $e'_i$ is initiated to the i-th unit vector. The vector g(e) may be called the global encoding vector along e. Any node t receiving along its h incoming edges the symbols:

$$\begin{bmatrix} y(e_1) \\ \vdots \\ y(e_h) \end{bmatrix} = \begin{bmatrix} g_1(e_1) & \cdots & g_h(e_1) \\ \vdots & \ddots & \vdots \\ g_1(e_h) & \cdots & g_h(e_h) \end{bmatrix} \begin{bmatrix} x_1 \\ \vdots \\ x_h \end{bmatrix} = G_t \begin{bmatrix} x_1 \\ \vdots \\ x_h \end{bmatrix}$$

can recover the source symbols $x_1, ..., x_h$ if the matrix Gt of global encoding vectors has rank h. In this above example, as applied to blockchain transaction network coding, transactions are stored in the array $[x_1, ..., x_h]$. Further details are found in Chou.

The global encoding vector for an outgoing edge e may be characterized as being based upon the local encoding of global encoding vectors of incoming edges e'.

It will be appreciated that network coding may be used to propagate transactions through the network. It may also be used within an overlay network designed to implement a distributed hash table of unconfirmed transactions in which each transaction is stored by at least two nodes to ensure redundancy within the distributed hash table. In this case, network coding may be used in sending the transaction to the two or more nodes for storage. However, the use of network coding may provide the additional advantage of being able to recover from loss of two or more nodes storing a transaction. Because intermediary nodes have received one or more messages containing combined data relating to the transaction, the missing transaction could be recovered from the network coding messages.

Figure 7:
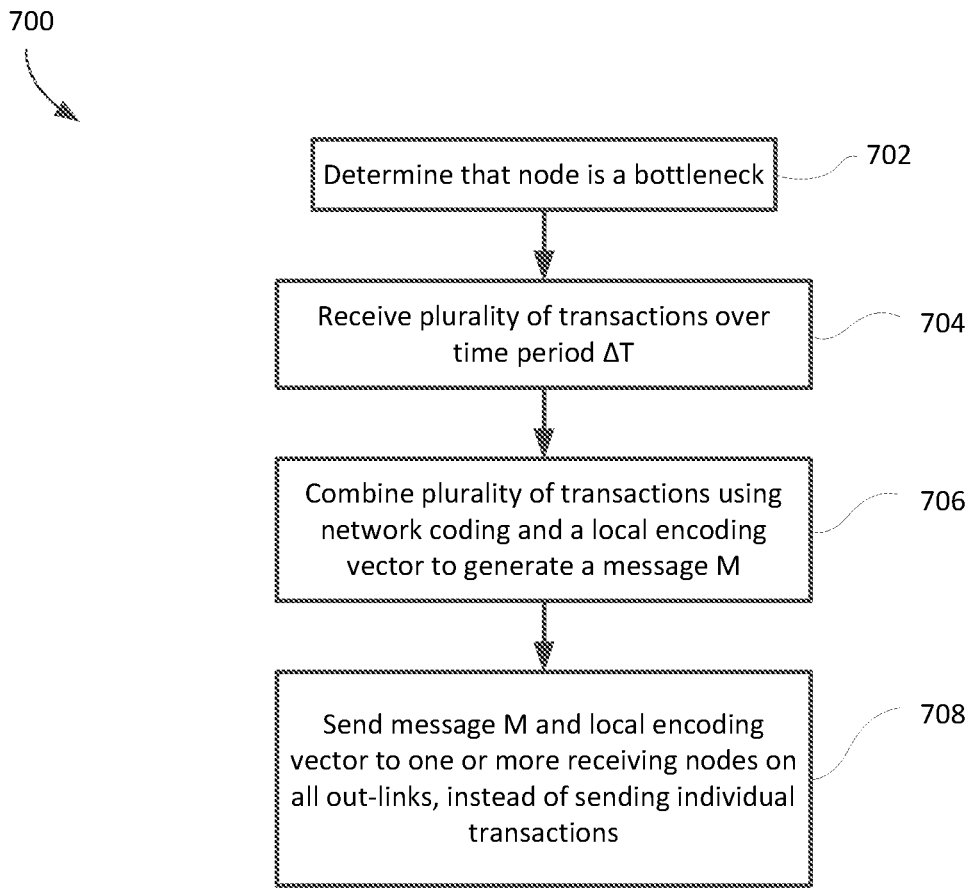
FIG. 7 shows, in flowchart form, an example process for propagating transactions in a network of nodes.

Reference is now made to FIG. 7, which shows, in flowchart form, an example process 700 for propagating transactions in a blockchain network. The process 700 is implemented by a node of the blockchain network. A node may be understood, in this context, to refer to a mining node, full node, validator node, or other type of discrete blockchain node in the blockchain network. The node is a computing device with network connection(s), computing resources, and executing software implementing the blockchain protocol.

In operation 702, the node determines that it is a potential bottleneck in the network at time T. This determination, as discussed above, may be based on a fan-in and fan-out comparison at time T. For example, if fan-in exceeds fan-out at time T, then the node may determine that it is a bottleneck. Other factors may alternatively or additionally be taken into account in determining whether the node is a bottleneck. Examples include average fan-in and fan-out over a time period, node location in the network topology, the current or historical status of the node's output queue, or any other factors relating to node capacity for propagating received transactions.

In operation 704, having determined that it is a bottleneck, the node accumulates transactions over a time period ΔT. The time period may be a predetermined length of time. In some example implementations, the time period may vary based on network traffic measurements, geographical information, or both. The time period not be a fixed time, but rather the accumulation of transactions may occur until a minimum number of transactions have been received, which may further be subject a maximum time so that the accumulated transactions are not held for too long.

In operation 706, the plurality of transaction that the node has accumulated are combined into a single message using network coding. The message may have a length as long as the longest of the transactions in some implementations. The message may have a length (in bits) no longer than the longest of the transactions in some implementations. The message is generated using a local encoding vector and a network coding algorithm.

The node then sends the message and a global encoding vector to one or more nodes in operation 708. The message is sent instead of sending the actual transactions. That is, the node does not send the plurality of accumulated transactions and, in their place, sends the message and the global encoding vector to peer nodes on all its out-links.

Figure 8:
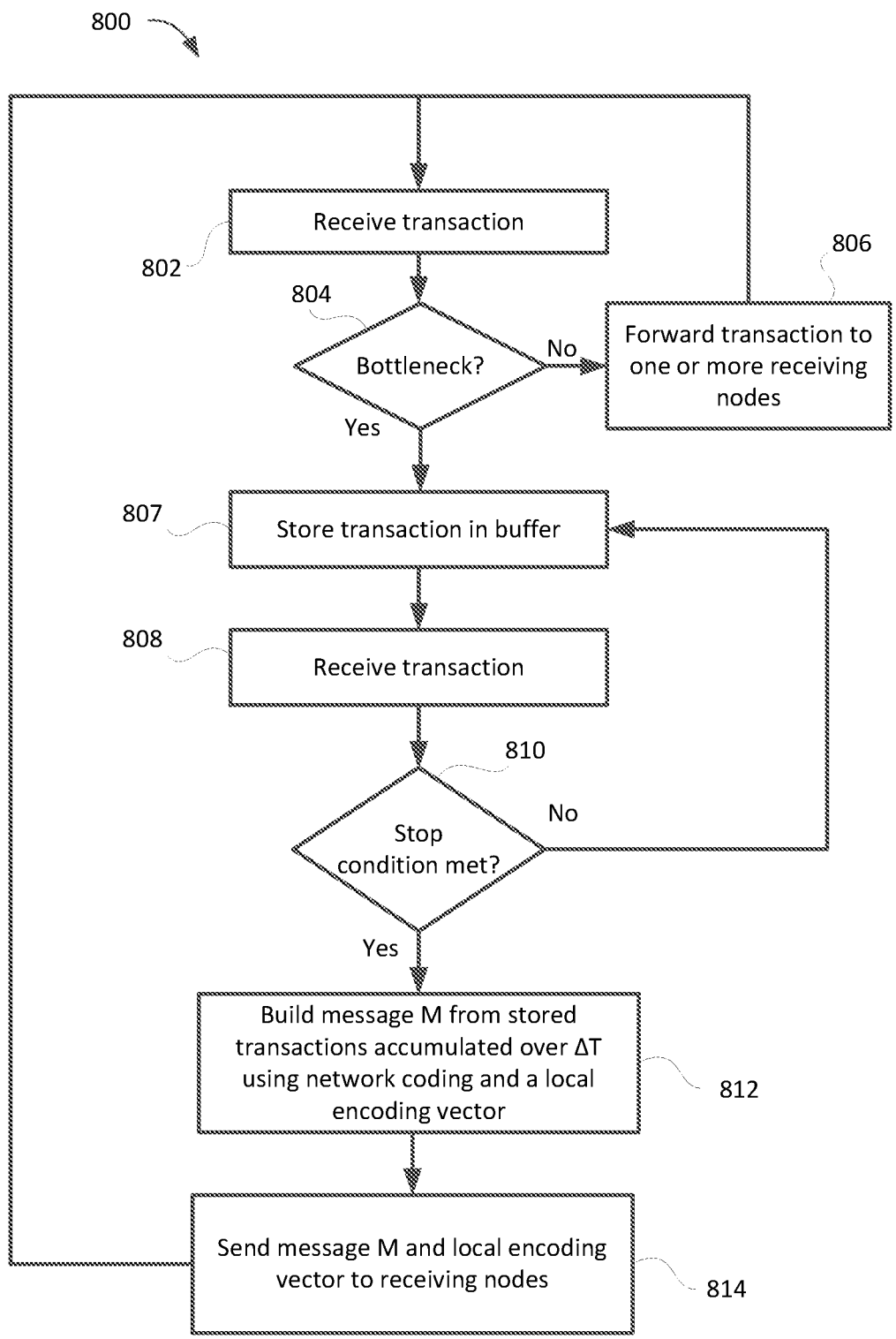
FIG. 8 shows, in flowchart form, another example process for propagating transactions in a network of nodes.

Reference will now be made to FIG. 8, which shows, in flowchart form, an example method 800 for propagating transactions in a blockchain network. As noted above, the method 800 may be implemented at a blockchain node having a plurality of in-links and out-links.

The blockchain node receives a transaction in operation 802. The received transaction is received via an in-link. The blockchain may validate the transaction against protocol requirements to ensure the transaction is legitimate. In operation 804, the node may determine whether it is a bottleneck with respect to the transaction. The determination may be based on an assessment of the balance between in-link (fan-in) and out-link (fan-out) at that time. The determination may be based on other factors, as discussed above.

If the node determines that it is not a bottleneck, then in operation 806 it forward the transaction to one or more peer nodes in the blockchain network on its out-links, as per normal. However, if the nodes determines that it is a likely bottleneck, the node stores the transaction in memory (for example, in a buffer or other memory element) in operation 807.

The node then continues to receive transactions, as indicated by operation 808, and store them until it determines that a stop condition has been met. In this example, the stop condition is that a time duration ΔT has elapsed. The time duration may run from the determination that the node is a bottleneck, or from receipt of the first transaction in operation 802, for example. Other conditions may be used instead of time duration; for example, accumulation of a maximum number of transactions in the memory, or any combination of such factors.

Once the stop condition is met, e.g. $\Delta T$ has elapsed in this case, the node then builds a message M from the stored transactions using network coding and a local encoding vector as indicated by operation 812. In operation 814, the node then sends this message and the global encoding vector to other nodes over all its out-links.

Adjustable Time Period for Network Coding

In some implementations, the time period $\Delta T$ may not be fixed. That is, the node may adjust $\Delta T$ from time-to-time based on characteristics of the network or the transaction traffic into and out of the node. In some embodiments, the time period $\Delta T$ may be adjusted after each $\Delta T$ expires, such that the time period is constantly adapting to the current traffic levels. In some embodiments, any adjustments to the time period $\Delta T$ are constrained within a minimum time period and a maximum time period. In some implementations, the time period $\Delta T$ may only be adjusted periodically, such as after every 2, 5, 10 or other number of time periods, or only when the determined adjustment would alter the time period by more than a threshold quantity or percentage.

Figure 9:
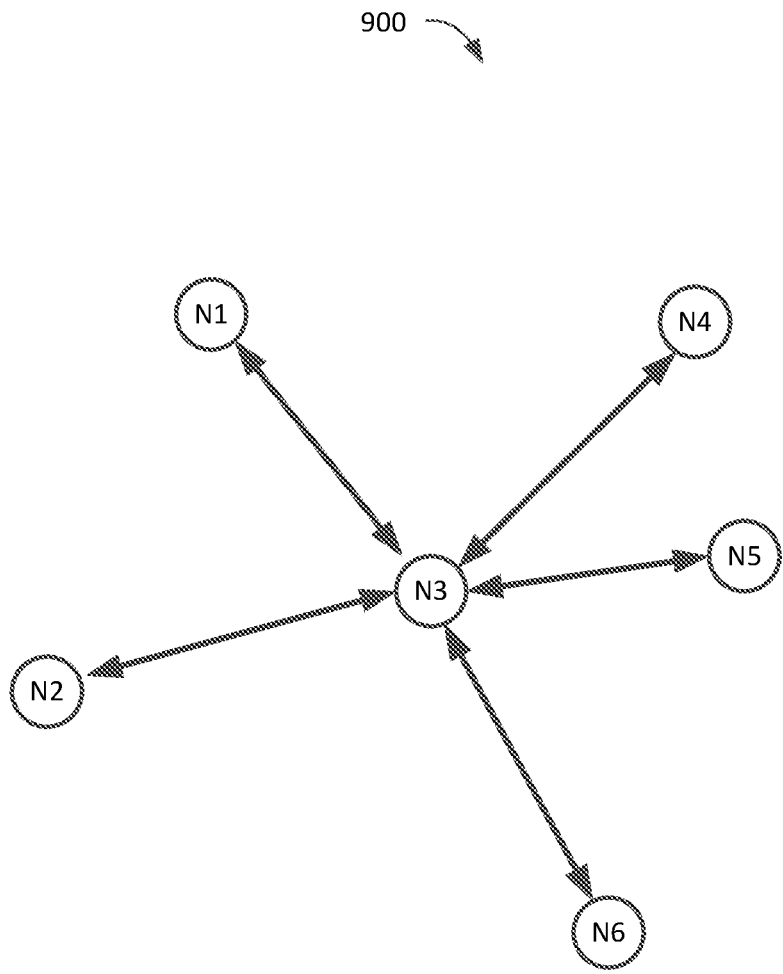
FIG. 9 illustrates and example of a network of nodes for propagating transactions.

In order to adapt to traffic conditions, the node may work with the concept of "throughput". The node may have in-links and out-links to a plurality of other nodes in the network. Reference is now made to FIG. 9, which diagrammatically illustrates an example network of nodes 900. Node N3 has in and out links to nodes N1, N2, N4, N5 and N6. These nodes may be characterized as (logical) first neighbours. In general, a node is aware of its first neighbours. That is, those nodes from which it may directly (without routing through another of the nodes of the network) receive a transaction or to which it may directly send a transaction. Note that a "first neighbour" is not necessarily geographically close and may be reachable through traversing a number of network elements and links (other than through another of the nodes).

The node N3 may keep track of its first neighbours in a table stored locally at node N3, such as the following example table:

TABLE 1

| Link to Node | In | Out |
|---|---|---|
| $N_1$ | $s_{1,i}$ | $s_{1,o}$ |
| $N_2$ | $s_{2,i}$ | $s_{2,o}$ |
| $N_4$ | $s_{4,i}$ | $s_{4,o}$ |
| $N_5$ | $s_{5,i}$ | $s_{5,o}$ |
| $N_6$ | $s_{6,i}$ | $s_{6,o}$ |

In the above example, the node N3 tracks the size $s_i$ of messages received over each in-link from nodes in the table and the size so of messages sent over each out-link to nodes in the table. The throughput of a link may be assumed to be equally allocated between input and output, i.e. bandwidth of the channel is equally divided, although that assumption may not always hold true. However, based on that assumption, the throughput Tr of the link or channel over the time period of analysis may be given by:

$$Tr \geq \Sigma s_i + s_o$$

That is, the throughput Tr must be greater than or equal to the total quantity of data sent or received over the link.

It will be appreciated that the assumption of equal throughput on in-link and out-links may not be respected in practical implementations. According, a balance parameter $\gamma \in [0,1]$ may be defined as the in/out throughput ratio, such that:

$$\frac{\Sigma s_i}{\Delta T} \leq Tr\gamma \text{ (for input)}$$

$$\frac{\Sigma s_o}{\Delta T} \leq Tr(1-\gamma) \text{ (for output)}$$

In the above expression, the parameter $\Delta T$ indicates the time period over which the size of messages sent/received is measured. It will be appreciated that the above expressions do not indicate the actual maximum throughput Tr of a channel or link, but rather show that the throughput Tr of a link or channel must be at least as large as is indicated by the actual usage data (size of messages actually sent/received). Accordingly, in some instances, the throughput Tr of a link may be estimated based on historical usage data, such as measurements of the size of messages sent and received over a link.

Throughput Tr of a link can be estimated using some other empirical data. For example, in the case of a network operating based on TCP/IP (i.e. Bitcoin is one example), it may be possible to determine throughput of a link using TCP Receive Window (RWIN) and Round Trip Time (RTT). RWIN indicates the amount of data that a node can received without sending any acknowledgement to a sender, and may be defined by the applicable communication protocol used by the network. RTT is a measurement of the time needed for a message of negligible size to go from a node at one end of the link to the node at the other end of the link and back again, which sometimes may be referred to as a ping message, or the like.

Other mechanisms may also be available for determining throughput Tr, including obtaining throughput information from neighbouring nodes, using preset or predetermined throughput estimates, or other sources of throughput estimation.

In some implementations of the present application, a node may maintain locally-stored information regarding the throughput estimates of its various links. The links may be links to first neighbour nodes. For example, Table 1 above may be modified to add a column relating to throughput estimates for each link:

TABLE 2

| Link to Node | In | Out | Tr |
|---|---|---|---|
| $N_1$ | $s_{1,i}$ | $s_{1,o}$ | $Tr_1$ |
| $N_2$ | $s_{2,i}$ | $s_{2,o}$ | $Tr_2$ |
| $N_4$ | $s_{4,i}$ | $s_{4,o}$ | $Tr_4$ |
| $N_5$ | $s_{5,i}$ | $s_{5,o}$ | $Tr_5$ |
| $N_6$ | $s_{6,i}$ | $s_{6,o}$ | $Tr_6$ |

The node may further determine a median or mean throughput of its available links.

As discussed above, network coding may involve combining a set of transactions received over a time period $\Delta T$ to generate a composite message M that is then sent out over out-links from the node, instead of propagating the individual messages. In some implementations of the present application, the time period $\Delta T$ may be at least partly based on throughput and the number of transactions received.

Throughput may be set based on the median or mean throughput of a node's available links, as described above.

Alternatively, in some instances, a node may initialize throughput to a global estimated throughput value based on some assumptions regarding the network. For example, the time period ΔT may first be initialized to a preset value and the number of transactions set to an estimated preset value, from which an estimated throughput may be determined. In the specific example case of the Bitcoin network the preset time period ΔT may be 3.5 seconds, since that this the approximate time needed for a transaction to reach 90% of nodes in the Bitcoin network. The time period ΔT may be initialized to another value in other implementations. The number of transactions that can be received in the time period ΔT may also be initially assumed to be a preset value. In the specific example of the Bitcoin network, the number of transactions N may be initialized to be 500 on the basis that the average block (in current implementations of Bitcoin) contains about 2000 transactions and 2000 divided by 3.5 is approximately 500. Other initialization values may be used in other implementations.

Having selected initial values for the time period ΔT and the number of transactions, a relationship between these parameters may then be established as the product of the time period ΔT and the number of transactions.

$$K = \Delta T_0 \cdot N_0$$

where K is set as a constant of inverse proportionality with respect to the time period ΔT and the number of transactions N. In the above expression, $\Delta T_0$ is the initialized value for the time period ΔT and $N_0$ is the initialized value for the number of transactions received. In other embodiments, the constant K may be initialized based on other assumptions or measurements, as described above. The constant K is related to throughput Tr insofar as it relates to the inverse proportional relationship between N and ΔT, and if each of the N transactions has a certain size, then the N transactions cumulatively represent a certain quantity of data, e.g. $s_i$, received over a ΔT time period. In some cases, the constant K may be determined based in part on an estimated or target throughput Tr.

The relationship between the concept of throughput Tr and the constant K is illustrated by the following expression:

$$Tr_i = N_{i-1} \frac{\text{Total size}}{K}$$

Having determined the initial constant K, the node monitors the number of transactions actually received on its in-links over the course of ΔT and determines whether to adjust ΔT. In at least one implementation, the adjustment to ΔT is based on the number of transactions received in at least one previous ΔT and the constant K. For example, one mechanism for determining $\Delta T_i$ is given by:

$$\Delta T_i = \frac{K}{N_{i-1}}$$

where i is an index. In this simplified example, the ΔT for a time i is based on the number of transactions received in the immediately preceding ΔT, with K being a constant. In some sense, K may be labelled an equilibrium constant, insofar as it is based on a the product of the time period and the number of transactions, and to the extent that too few transactions are received in a time period to meet the equilibrium constant then the time period may be lengthened to try to maintain the equilibrium constant.

In another example implementation, the number of transactions received may not be solely based on the previous time period $\Delta T_{i-1}$, but instead may be based on the average of two or more previous time periods. In some cases, the average may be determined as a weighted average to give greater weight to more recent time periods.

In other example implementations, the throughput may also be adjusted over time based on any one of a number of factors. In one example, the constant K may be initialized based on the median or mean throughput values from one or more neighbouring nodes.

Figure 10:
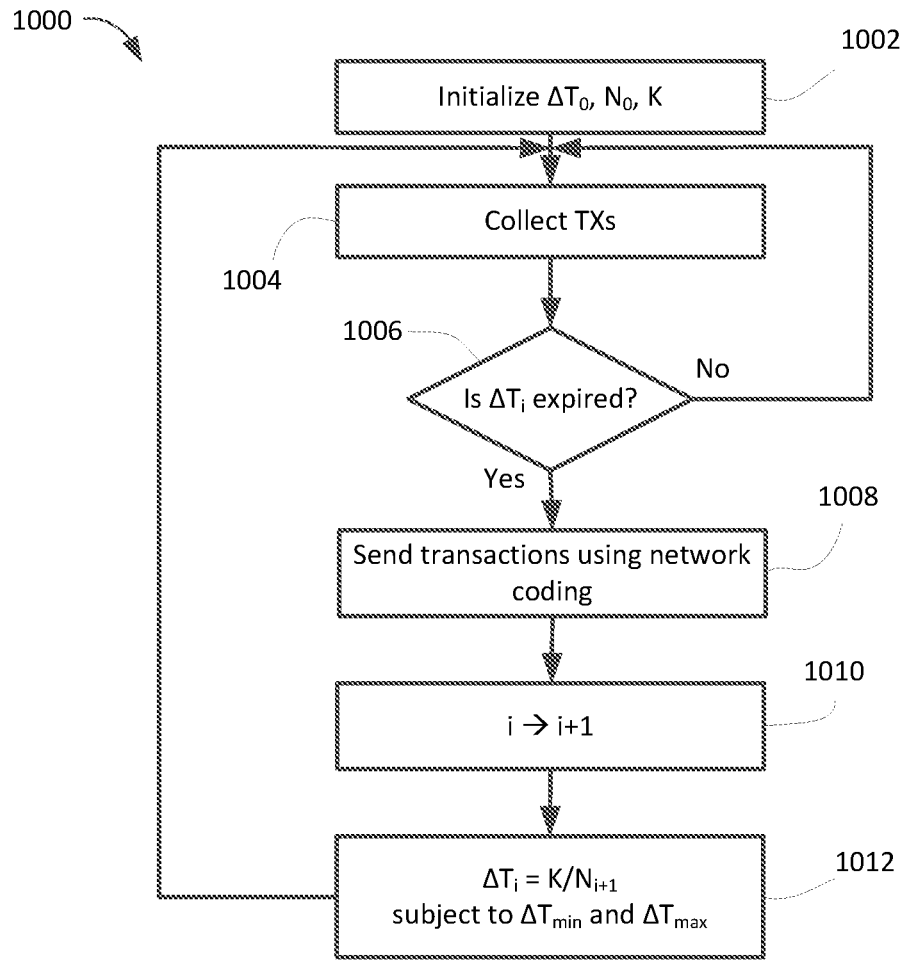
FIG. 10 shows, in flowchart form, an example method for propagating transactions using network coding with an adjustable time period.

Reference is now made to FIG. 10, which shows, in flowchart form, one example method 1000 for propagating transactions in a network of nodes using network coding. The method 1000 is implemented at one of the nodes in the network of nodes. In this example, the node is configured to use network coding for propagating transactions.

In operation 1002, certain parameters may be initialized. For example, the initial time period $\Delta T_0$ may be set to a predetermined value. As discussed above, in some cases the initial time period $\Delta T_0$ may be set to a value derived from the current time periods ΔT being used by neighbouring nodes. In some cases, the initial time period may be calculated based on a predetermined throughput value and an anticipated number of transactions. Other mechanisms, including combinations of the above, may be used to determine the initial time period $\Delta T_0$.

Optionally, the number of transactions $N_0$ may also be initialized, if that parameter is used in determining either the initial time period $\Delta T_0$ or the constant K, i.e. the equilibrium constant. In some cases, the number of transactions $N_0$ may be used to determine the constant K, for example using an expression such as:

$$K = \Delta T_0 \cdot N_0$$

In some cases, the number of transactions $N_0$ may be used as the basis for determining the initial time period $\Delta T_0$ using a predetermined constant K, for example using an expression such as:

$$\Delta T_0 = \frac{K}{N_0}$$

The constant K may be determined using the initial time period $\Delta T_0$ and the number of transactions $N_0$, but in some other cases it may be set to a preset or predetermined equilibrium constant value. The node may update the predetermined value of the constant K as the network changes if alterations to the network or the protocols used effect the possible characteristics of the links to the node, which may influence transaction volume and/or throughput. In some cases, the constant K may be determined empirically. For example, the constant K may be determined using past data regarding throughput. In another example, the constant K may be determined based on a round trip time test, as described above. In yet another example, the constant K may be determined based on data regarding throughput at one or more neighbouring nodes. As an illustration, the current node may average the throughput values associated with its neighbouring nodes and use that to estimate the equilibrium constant to arrive at the constant K.

In operation 1004, having initialized at least the initial time period $\Delta T_0$ and the constant K, the node then receives transactions on its in-links. The transactions are buffered in memory at the node. As indicated by operation 1006, the node continues to receive and retain transactions on its in-links until the time period $\Delta T_i$ has expired. It will be appreciated that i is simply an index and that i is initially set to 0.

Once the time period has expired, then in operation 1008, the transactions are sent using network coding. This may include combining the transactions using a network coding operation to generate a message M and sending the message over the nodes out-links.

In operation 1010, index i is incremented and the node then, in operation 1012, updates the time period $\Delta T_i$. In this example, the updated time period $\Delta T_i$ is based on the constant K divided by the actual number or count of transactions received during the previous time period $\Delta T_{i-1}$. The adjustment to the time period $\Delta T$ may be subject to certain constraints, such as a maximum that it cannot exceed or a minimum that it cannot fall below. In some implementations, the adjustment may be based on more than one previous time period and the counts of transactions received in those time period. In some implementations different or additional constraints may be imposed on the adjustment to the time period $\Delta T_i$, such as, for example, no more than a certain percentage change per iteration.

Figure 11:
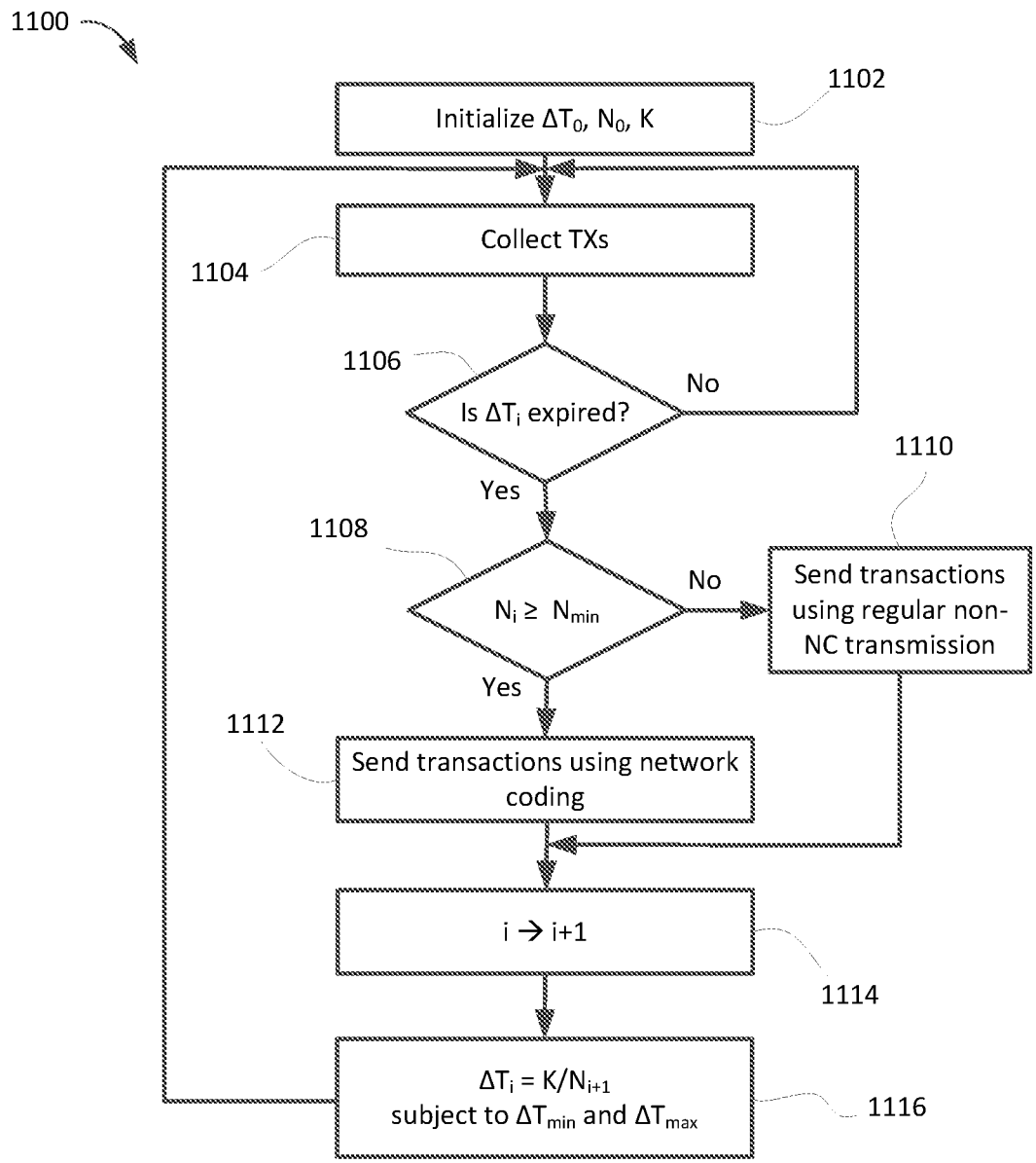
FIG. 11 shows, in flowchart form, an example method for propagating transactions selectively using network coding with an adjustable time period.

In this example, the node uses network coding to send the transactions in each iteration. In another example implementation, the node may selectively use network coding when the quantity of transactions in a time period justify the use of network coding. Reference is now made to FIG. 11, which shows, in flowchart form, an example method 1100 for propagating transactions in a network of nodes.

Operations 1102, 1104 and 1106 correspond to operations 1002, 1004, and 1006 in FIG. 10, discussed above. At operation 1108, the node assesses whether a sufficient number of transactions were received during the time period $\Delta T_i$ to justify using network coding. In some examples, this assessment may involve comparing the number of transactions $N_i$ received with a minimum number of transactions $N_{min}$ that is prescribed for use of network coding. If the minimum is met, then, in operation 1112, the transactions are sent using network coding. If the minimum is not met, then, in operation 1110, the transactions are sent using regular non-network-coding transmission.

Operations 1114 and 1116 correspond to operations 1010 and 1012 in FIG. 10, as discussed above.

It will be appreciated that various operations or steps in the example methods 1000 and 1100 may be altered and, in some cases, omitted, without changing the principle of operation of the process. Additional operations may also be added that are not illustrated without changing the principle of operation of the process. All such variations are intended to be included herein.

Each node may maintain a record of its current time period $\Delta T$ (or, in some cases, running average time period or weighted average time period, etc.) and may periodically inform its neighbouring nodes of its current time period $\Delta T$. In this manner, each node may track the time periods $\Delta T$ being used by its neighbours. Accordingly, when a new node joins the network, instead of initializing the node's parameters using assumptions regarding the network, the node may initialize its parameters based on its neighbours' parameters. For example, the new node may obtain the time periods $\Delta T$ (or average time periods $\Delta T$) used by its first neighbours and may set its initial time period $\Delta T$ based on an average or other combination of its neighbours time periods. This may accelerate adaptation of the new node to the characteristics of the network and improve the speed of adaptation.

Figure 12:
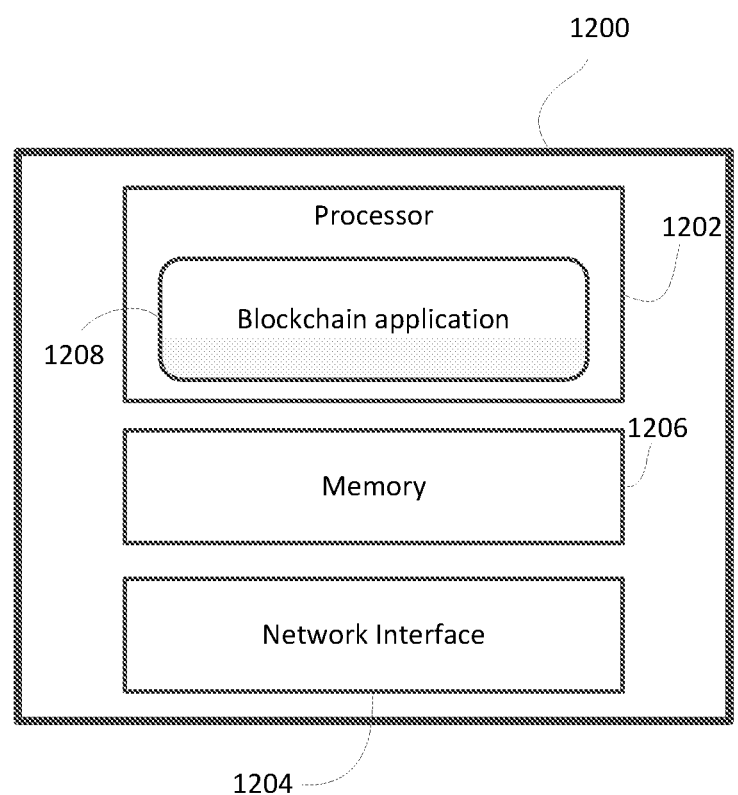
FIG. 12 shows, in block diagram form, an example blockchain node.

Reference will now be made to FIG. 12, which shows, in block diagram form, a simplified example of a participating node 1200. The node 1200 includes a processor 1202, which may include one or more microprocessors, application specific integrated chips (ASICs), microcontrollers, or similar computer processing devices. The node 1200 further includes memory 1204, which may include persistent and non-persistent memory, to store values, variables, and in some instances processor-executable program instructions, and a network interface 1206 to provide network connectivity over wired or wireless networks.

The node 1200 includes a processor-executable blockchain application 1208 containing processor-executable instructions that, when executed, cause the processor 1202 to carry out one or more of the functions or operations described herein.

It will be understood that the devices and processes described herein and any module, routine, process, thread, application, or other software component implementing the described method/process for configuring the node may be realized using standard computer programming techniques and languages. The present application is not limited to particular processors, computer languages, computer programming conventions, data structures, or other such implementation details.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

What is claimed is:

1. A node to propagate transactions in a network of nodes, each node having one or more connections to other nodes, the node comprising:
   a processor;
   memory;
   a network interface; and
   an application containing processor-executable instructions that, when executed by the processor, cause the processor to:
   receive a plurality of incoming transactions over a time period;
   combine the plurality of incoming transactions using network coding to generate a composite message;
   send the composite message to one or more nodes in the network; and
   determine an adjusted time period based on an equilibrium constant parameter based on a count of transactions in the plurality of incoming transactions received over the time period; and determine that the count of transactions received in the time period exceeds a minimum count to use network coding, and wherein the combining and sending are conditional on the determination for exceeding the minimum count.

2. The node of claim 1, wherein the instructions, when executed, further cause the processor to iteratively repeat the receiving, combining, and sending operations using the adjusted time period and to determine a further adjusted time period after each iteration for use in a subsequent iteration.

3. The node of claim 1, wherein the instructions that cause the processor to determine the adjusted time period are based at least in part on a minimum time period that the adjusted time period cannot be below and a maximum time period that the adjusted time period cannot be above.

4. The node of claim 1, wherein the instructions, when executed by the processor, further cause the processor to determine an average time period based on a plurality of adjusted time periods and to store the average time period in the memory.

5. The node of claim 4, wherein the instructions, when executed by the processor, further cause the processor to send the average time period to one or more neighbouring nodes in the network of nodes.

6. The node of claim 1, wherein the instructions, when executed by the processor, further cause the processor to initialize the equilibrium constant parameter based on one or more throughput estimates for one or more links to said one or more other nodes.

7. The node of claim 1, wherein the instructions, when executed by the processor, further cause the processor to initialize the equilibrium constant parameter based on an estimated initial time period and an estimated initial count of transactions.

8. The node of claim 1, wherein the instructions, when executed, are to cause the processor to determine the adjusted time period by determining the adjusted time period based on the equilibrium constant parameter divided by the count of transactions.

9. A computer-implemented method of propagating transactions in a network of nodes, each node having one or more connections to other nodes, the method, implemented at one of the nodes, including:

receiving a plurality of incoming transactions over a time period;

combining the plurality of incoming transactions using network coding to generate a composite message;

sending the composite message to one or more nodes in the network;

determining an adjusted time period based on an equilibrium constant parameter and a count of transactions in the plurality of incoming transactions received over the time period; and determine that the count of transactions received in the time period exceeds a minimum count to use network coding, and wherein the combining and sending are conditional on the determination for exceeding the minimum count.

10. The method of claim 9, further comprising iteratively repeating the receiving, combining, and sending operations using the adjusted time period and determining a further adjusted time period after each iteration for use in a subsequent iteration.

11. The method of claim 9, wherein determining the adjusted time period comprises determining the adjusted time period based on the equilibrium constant parameter divided by the count of transactions.

12. The method of claim 11, wherein the determining of the adjusted time period is subject to a minimum time period that the adjusted time period cannot be below and a maximum time period that the adjusted time period cannot be above.

13. The method of claim 9, further comprising determining an average time period based on a plurality of adjusted time periods and storing the average time period in memory at one of the nodes.

14. The method of claim 13, further comprising sending the average time period to one or more neighbouring nodes in the network of nodes.

15. The method of claim 9, further comprising initializing the equilibrium constant parameter based on one or more throughput estimates for one or more links to one of the nodes.

16. The method of claim 9, further comprising initializing the equilibrium constant parameter based on an estimated initial time period and an estimated initial count of transactions.

17. The method of claim 9, further comprising determining that the count of transactions received in the time period exceeds a minimum count to use network coding, and wherein the combining and sending are conditional on that determination.

18. A non-transitory processor-readable medium storing processor-executable instructions to participate in a transaction among a plurality of participating nodes, wherein the processor-executable instructions, when executed by a processor in one of the plurality of participating nodes, cause the processor to carry out the method of claim 9.

* * * * *